Figure 1:
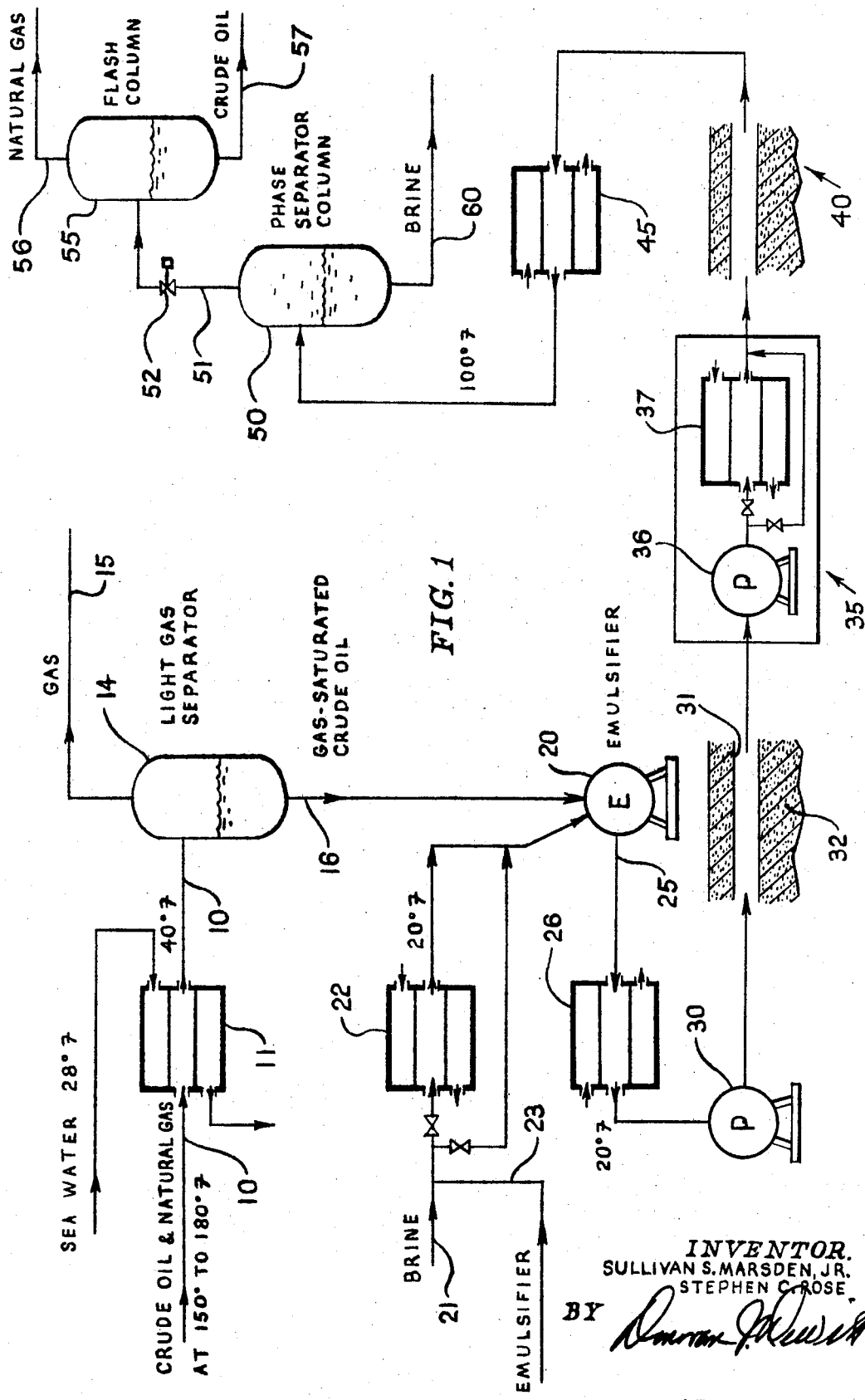

United States Patent
Marsden, Jr. et al.

[15] 3,670,752
[45] June 20, 1972

[54] PIPELINING CRUDE OILS AND TARS CONTAINING DISSOLVED NATURAL GAS AT SUB-FREEZING TEMPERATURES IN ORDER TO AVOID ENVIRONMENTAL DAMAGE

[72] Inventors: Sullivan S. Marsden, Jr., Dept. of Petroleum Engring., Stanford University, Stanford, Calif. 94305; Stephen C. Rose, 600 Liddon Court, Midland, Tex. 79701

[22] Filed: Feb. 26, 1971

[21] Appl. No.: 119,312

[52] U.S. Cl. .............................................................. 137/13
[51] Int. Cl. .............................................................. F17d 1/16
[58] Field of Search .................................. 137/13, 1; 208/370

[56] References Cited

UNITED STATES PATENTS 3,519,006  7/1970  Simon ........................................ 137/13

*Primary Examiner*—Alan Cohan
*Attorney*—Donovan J. De Witt and Gregg, Hendricson & Caplan

[57] ABSTRACT

Crude oils and tars, such as those obtained from the Prudhoe Bay Oil Field and the Athabasca Tar Sands, can be efficiently transported through a large diameter insulated pipeline at temperatures below 32° F., for example, between about 15° to 30° F., in the form of 40 to 70 percent oil-in-brine emulsions containing salts dissolved in the water in amounts sufficient to prevent freezing at said temperatures. These operating conditions permit the insulated pipeline to be buried in the ground without causing thawing of the permafrost which will lead to significant damage to both the environment and the pipeline. Subsurface construction of a pipeline of this sort has considerable economic advantage over the above-ground, supported construction required for a heated oil pipeline to avoid environmental damage. Dissolution of gas in the crude oil at these low temperatures, thus allowing transport of the gas in the same pipeline, will also add considerable economic advantage. Even at these low temperatures, the emulsion has an effective viscosity comparable to that of the oil alone at much higher temperatures so that energy consumption for pumping is at an acceptable level. On arriving at the discharge terminal, the cold emulsion can then be broken down into its constituents by heating the same either with or without the addition of demulsifying chemicals.

6 Claims, 2 Drawing Figures

PIPELINING CRUDE OILS AND TARS CONTAINING DISSOLVED NATURAL GAS AT SUB-FREEZING TEMPERATURES IN ORDER TO AVOID ENVIRONMENTAL DAMAGE

BACKGROUND OF THE INVENTION

While crude oils produced in Arctic and sub-Arctic regions are liquid at their elevated production temperatures, they often become semi-solid or solid masses during many seasons of the year when cooled to the ambient surface temperatures at which they are handled and transported. Each crude oil has a characteristic temperature known as the pour point at which this transition to an immobile mass takes place. Both because of this phenomenon and because of the sharp increase of viscosity with decreasing temperature, it is common practice to maintain crude oils in pipelines in a heated condition by periodic reheating of the oil in order to keep pumping power consumption and pipeline pressures at acceptable levels.

Tars such as those found in the Athabasca Tar Sands exist in nature as solid material and even after physical separation from the sands, they are still solid at ambient surface temperature. Even heating is usually insufficient to decrease their viscosity to an acceptable level and so chemical degradation to a pumpable liquid material at the separation site is the accepted practice. Again, it may be desirable to heat the material in the pipelines to reduce the pumping costs of these degraded materials.

In the Arctic and some sub-arctic regions there exists a potentially unstable sub-surface condition known as permafrost. This results from the inclusion of ice in some form or another in the soil or other granular material underlying the tundra. While the ice near the surface will melt during the annual change of seasons, that below a measurable and rather shallow depth is permanently frozen and hence known as permafrost. Experience has shown that disturbance of the tundra or the raising of the temperature at or near the ground surface will lead to partial thawing of the upper layers of permafrost and that the resulting water will cause erosion, subsidence and other severe damage to the environment. Heat loss from a surface-layed or buried pipeline carrying hot oil, even though it is well insulated, would lead to such damage to the environment. In extreme cases it may lead to rupture of the pipe from uneven settling of the pipeline, and the damage to the environment from flooding with crude oil may be even worse.

Natural gas is frequently produced with crude oil either as a separate fluid phase, or dissolved in the crude oil or both. It is common practice to separate the two at or near the well-head and transport them in different pipelines either to a tanker terminal, a refinery or a consumer. Natural gas is relatively more expensive to transport than crude oil, and in production areas remote from consumption areas, it is often just disposed of through burning or flaring. With the relatively recent advent of liquified natural gas (LNG) tankers, it is now possible to transport said product over large bodies of water once it is transported to a tanker terminal.

It is well established that the solubility of natural gas in crude oil decreases as the temperature increases and conversely that the solubility of gas in crude oil increases as the temperature is lowered. This solubility also depends on the pressure and on the composition of the gas and oil. Well-known correlations exist for predicting the solubility from a knowledge of the specific gravity of the gas and the gravity of the crude oil in °API. If natural gas produced with the crude oil is either retained in solution in the crude oil or else redissolved in the emulsified crude oil, then the cold emulsion pipeline can also be used as a means of transporting significant quantities of dissolved natural gas.

The development of tar sands in the Arctic and sub-Arctic now requires that both physical separation of the tar from the sand as well as subsequent processing of the tar by cracking or otherwise to form a low viscosity material be carried out at the mining site. Because of its remoteness from civilization, the construction and maintainence of such equipment is very expensive. The transportation of the tar as a suspension or slurry in a brine (an aqueous salt solution) which has a safe freezing point would allow economical transportation of the tar to less expensive refineries closer to the markets for the final products.

The method involving pumping of heated crude oil through a pipeline has other disadvantages. In order to avoid damage to the environment through melting of the permafrost, hot oil pipelines may be mounted on pile-supported frames constructed several feet above the surface of the ground. This will lead to serious ecological disruption through hindering or preventing the movement and migration of animals native to the area. A pipeline so mounted is more expensive to construct, is subject to damage or rupture from gunfire and has significantly greater heat loss, even when well insulated, both because of the high winds occurring in the Arctic and because of the lack of insulation afforded by the surrounding soil. In the event of a pump, power or pipe failure which would lead to suspension of pumping, a hot oil pipeline may, depending on the pour point and other properties of the oil, be extremely difficult or impossible to put into operation again because of the inevitable cooling and setting of the oil with time and the attendant difficulty in getting it to flow again.

It is an object of this invention to provide a method for pumping crude oils through a pipeline which avoids the above and other disadvantages which characterize a hot oil pipeline transport system in the Arctic and sub-Arctic. A further object is to provide a method of this character whereby the oil, at temperatures well below the freezing point of pure water, can be efficiently pumped through a buried pipeline without melting the permafrost and thus damaging the environment. In addition, natural gas may be dissolved in the emulsified crude oil and thus transported in a very efficient manner. The nature of still other objects of the invention will be apparent from a consideration of the descriptive portion to follow.

SUMMARY OF THE INVENTION

In accordance with the present invention, it has been found that crude oils produced in the Arctic and sub-Arctic, including those obtained from the Prudhoe Bay Field, can readily be pumped through a pipeline at temperatures below 32° F. when emulsified with a brine to provide an oil-in-brine emulsion containing from about 40 to 70 percent by volume of the oil. The temperature may be within the range of about 15° to 30° F., but the optimum temperature will be determined primarily by the freezing point of the brine available and, to a secondary extent, by the pour point of the crude oil. In coastal areas such as Prudhoe Bay, sea water having a freezing point of approximately 28° F. is obviously available. When drilling oil wells, it is quite a common occurrence for the bit to penetrate brine-producing formations having a significantly higher salt concentration and therefore a lower freezing point than sea water. Such a brine, which may contain salts other than sodium chloride, would be suitable providing it did not contain unusually corrosive materials or obnoxious ones which would lead to disposal problems at the terminal. During transit through the pipeline, the emulsion would tend to absorb heat because of friction between the emulsion and the pipe. As a result, the emulsion may either tend to get warmer or cooler depending on the efficiency of any insulation employed and on the temperature of the surrounding ground at the particular time of the year. This will be true even with a 4 inch layer of plastic foam insulation, and thus refrigeration may be necessary during some seasons of the year at the supplementary pumping stations along the line.

If the operating temperature for all or a portion of the pipeline (as determined by the freezing point of the brine available, the heating due to frictional energy loss in the pipeline and the ground temperatures external to the pipeline) is below the pour point of the crude oil, the oil droplets of the emulsion will tend to form semi-solid or solid particles which will agglomerate less readily than would liquid oil droplets.

This is a significant advantage for relatively high pour point crude oils because less emulsifying agent will be required. In a manner of thinking, tars from tar sands may also be considered to be very high pour point crude oils, and hence the application of this invention to their pipeline transportation is apparent. Dissolution of natural gas in the oil droplets of the emulsion will, for most crude oils, somewhat depress the pour point thereof. However, the economic advantage of being able to transport the natural gas will be greater than the cost of any additional emulsifyer required.

It has been found that the foregoing 40 to 70 percent oil-in-brine emulsions have a low viscosity at temperatures below 32° F. and can readily be pumped. For example, at 20° F. the viscosity of a 40 percent Prudhoe Bay crude oil-in-brine emulsion is approximately 15 cp., while that of the corresponding 60 percent oil-in-brine emulsion is approximately 50 cp. On the other hand, Prudhoe Bay crude oil itself typically has a viscosity of about 293 cp. at 20° F. and thus is too heavy to be pumped at that temperature.

The emulsion may also contain a small amount, usually from about 0.1 to 5 percent by weight, of a conventional surface-active agent of the non-ionic type which is added to facilitate the formation and preservation of the emulsion. A wide variety of non-ionic surfactant compounds may be used for this purpose, and the following are exemplary classes or groups of surfactant compounds which are effective:

A. Oil-soluble monohydric alcohols, for example, the octanols, nonanols, decanols, undecanols, dodecanols and the higher aliphatic alcohols. These may be synthetic alcohols, for example, alcohols produced by the so-called oxo process, or they may be of natural origin, for example, fatty alcohols from sperm oil. Also oil-soluble aromatic and cycloaliphatic alcohols such as benzyl alcohol and methylcyclohexanol may be used.

B. Oil-soluble dihydric alcohols such as the hexylene glycols, octylene glycols, decylene glycols and the higher glycols.

C. Oil-soluble alcohols containing substituents such as ether and/or ester groups. Particularly effective members of this class are the partial esters of polyhydric alcohols and fatty acids such as glyceryl mono- or di-oleate or stearate, ethylene glycol mono-oleate or stearate and the monoesters or ethers of polyethylene glycols such as the mono-oleate or stearate of nona-ethylene glycol. The commercially available mixtures of compounds of the aforesaid types may be used.

D. Glycol or polyglycol ethers of the type obtainable by causing an aromatic or hydroaromatic hydroxyl compound substituted in the nucleus by at least one hydrocarbon radical or equivalent thereof, containing at least four carbon atoms, to react with an alpha, beta-alkylene oxide, such as ethylene oxide, propylene oxide, butylene oxide, or the like. Illustrative examples of non-ionic surfactants of the last-mentioned group are reaction product obtained by condensing iso-octyl phenol with ethylene oxide in a mole ratio of 1:10 (this product is commercially sold by Rohm and Haas as "Triton X-100"), and the same firm's Triton X-114, a similar product, but containing from seven to eight ethylene oxide groups; and an alkyl phenol having an alkyl side chain of eight or nine carbon atoms, which has been oxyethylated with about 10 moles of ethylene oxide per mole of phenol (Hercules Powder Company's "Synthetic B-79").

The formation of the oil-in-brine emulsion is also facilitated by the presence of the sodium chloride, particularly when an emulsifying agent of the non-ionic type is employed. It is believed that the salt increases the surface activity of the surfactant.

The presence of the surfactant emulsifying agent also lowers the freezing point of the brine somewhat beyond that due to the dissolved salts alone. The degree of this supplementary lowering depends on both the emulsifying agent and its concentration.

It also forms a feature of this invention to employ the cold emulsion stream as a vehicle in which to dissolve natural gases which are recovered from the well along with the crude oil. Such gases, typically recovered in such amounts as 800 std. cu. ft. per barrel of oil for Prudhoe Bay Crude Oil, can be partially or entirely redissolved in the emulsified crude oil and to a very minor extent in the brine. The amount dissolved will depend on the concentration of oil in the emulsion, the lowest pressure in the pipeline, which will usually be at the terminal, and the emulsion temperature at this lowest pressure. This amount of dissolved gas can be calculated by well-established engineering methods from a knowledge of the gravity of the oil, the specific gravity of the gas, the temperature and the lowest pressure in the pipeline. For example, a 60 percent emulsion of Prudhoe Bay crude oil having a gravity of 28°API will dissolve approximately 100 std. cu. ft. of natural gas having a specific gravity of 0.8 when the terminal pressure is 700 psia and temperature is 30° F. It would be a matter of economics as to whether to operate the pipeline at higher minimum pressures, lower temperatures or a greater concentration of oil in the emulsion to increase the amount of natural gas transported by the pipeline. For example, with the same Prudhoe Bay crude oil and natural gas as referred to above, a pipeline with a minimum pressure of 1,000 psia and temperature 20° F. would carry 180 std.cu. ft. of natural gas in a 60 percent emulsion.

If the natural gas contains significant amounts of such corrosive and valueless constituents as carbon dioxide, as does the gas from the Prudhoe Bay Oil Field, separation of these constituents from the gas prior to introduction of the gas into the emulsion will be desirable. Some natural gases found in Arctic and sub-Arctic fields contain significant amounts of such corrosive and poisonous gases as hydrogen sulfide, and these gases should also be removed. Separating the methane from the less volatile and more valuable other hydrocarbons in the natural gas will allow more of the latter to be transported in the emulsion. Equipment for carrying out these separations already exists and is in operation in other oil and gas fields. Methane so separated is desirably employed as a fuel for the boiler or other power-generating equipment.

In forming the emulsion one of two general approaches can be used, with each having particular advantages for different types of oils. Thus, in one embodiment of the invention, which is shown in FIG. 1 of the drawings, the hot crude oil, which comes from the well at temperatures such as 150° to 180° F. for the Prudhoe Bay Field, is cooled in the presence of the produced natural gas to approximately the lowest temperatures (about 40° F.) at which the oil can be readily pumped. During this cooling, which is carried on in standard heat exchange equipment capable of operating at the elevated pressures required and using typically sea water at 28° F. as the coolant, a significant part of the natural gas, particularly the less volatile components such as ethane, propane and the butanes, dissolve and redissolve in the crude oil. The amount dissolved will depend on the composition and properties of both the crude oil and natural gas, as well as the minimum operating temperatures and pressures, and this can be calculated by standard engineering methods. After the excess undissolved gases have been separated from the gas-saturated crude oil, the emulsion is formed by intermingling of the oil and the brine, preferably refrigerated to pipeline temperatures, for example, 20° F., along with the necessary emulsifying agent, in one of several types of equipment used to produce oil-in-brine emulsions. These may incorporate high velocity pumps, ultrasonic emulsifiers, T-arrangements or perforated plates or screens in the oil inlet sides. In some cases, the formation of a more concentrated emulsion than that desired for pipelining, followed by dilution with brine to the desired concentration, is advantageous. In other cases further cooling of the emulsion to lower temperatures is desirable.

Figure 2:
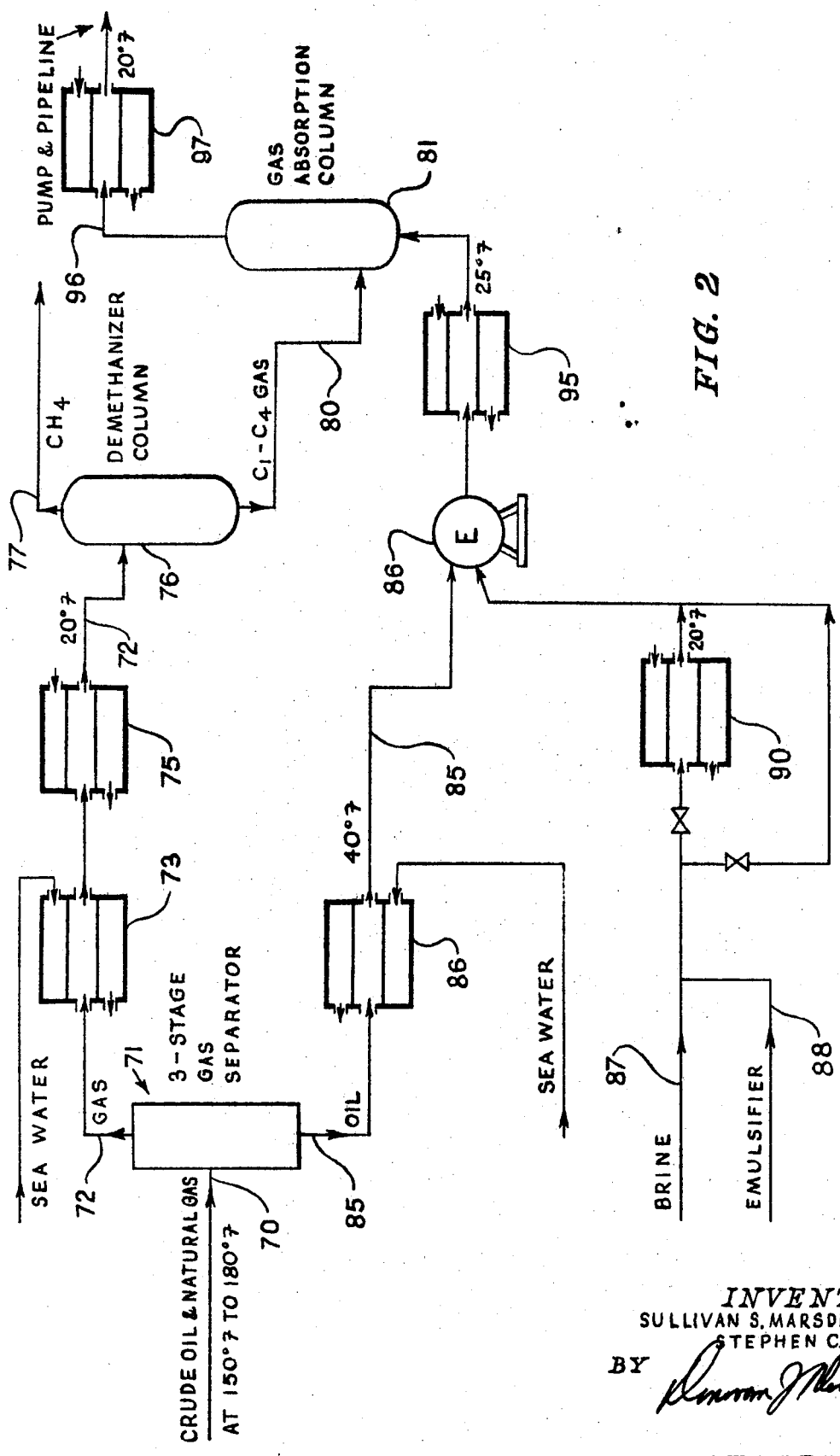

In FIG. 2 of the drawings there is shown another embodiment of the invention which has advantages for some types of crude oils. In this method, the crude oil and natural gas are separated by running the oil through one or more standard oil field units known as "separators" until a stabilized crude oil, which will not evolve gas at atmospheric pressure and the operating temperature of the last separator, is produced. For example, crude oil from the Prudhoe Bay Field would require a three stage separator to produce a stabilized crude oil having a gravity of 28°API at 115° F. After further cooling to some temperature within the range of 40° to 70° F., the oil-in-brine emulsion is formed by one of the methods described above. After cooling the emulsion to or near the temperature at which it is to be pumped, a portion of the gas is redissolved in the emulsified oil. Further cooling during or following the dissolution step will be necessary to extract the heat of solution of the gas in the crude oil.

Combinations of these two approaches, that is, partial separation of the gas, cooling, emulsification dissolution of the gas and further cooling will have advantages for some combinations of crude oils and natural gas.

Once the emulsion is at the desired temperatures, it is pumped through the buried pipeline using any one of several types of pumps such as those of a reciprocating or centrifugal character, said pumps being installed at the head of the line as well as at a number of intermediate points when the line is many miles in length. The emulsion will be heated in some small degree between pumping stations, and when the oil at any given pumping station reaches a level above the maximum temperature to be maintained in the pipeline, the emulsion is refrigerated before being reintroduced into the line.

When the oil-in-brine emulsion reaches the pipeline terminal, the emulsion may be broken by use of heat and chemicals and the gas removed from solution in the oil by a reduction of pressure to atmospheric pressure. Separators for accomplishing this are already existant in oil fields. Alternatively, the gas may be removed by heating and reduction of pressure while at the same time maintaining at least a portion of the oil in emulsified form. Additional oil may be incorporated in the emulsion to a concentration of 95 to 98 percent and this very concentrated emulsion shipped in tankers where it has the advantage of a lower flash point than the pure crude oil and would lead to less-permanent pollution of the ocean in case of a serious maritime accident.

Referring more particularly to the drawings, there is shown in FIG. 1 a schematic flow diagram of a pipelining system wherein the hot crude oil, containing dissolved gas, is pumped through line 10 into a heat exchanger 11, where the oil is cooled by cold sea water (28° F.) to a temperature of about 40° F., and thence into a separator column 14. From this column, which is operated under system pressures, lighter excess gases are taken overhead through line 15, while the gas-saturated crude oil is taken as a bottoms stream and passed via line 16 to an emulsifier unit 20. The brine component of the emulsion is pumped through line 21 to unit 20 along with a solution of an emulsifying agent, as supplied through line 23. This brine stream, if not already at temperatures below about 25° F. as a result of being stored under cold atmospheric conditions, can be refrigerated by passage through a heat exchanger 22 before being pumped into the emulsifying unit 20.

The oil-in-brine emulsion created by unit 20 passes through line 25 to a heat exchanger 26 which refrigerates the stream and brings the same to the desired pipeline temperature here shown as 20° F. The refrigerated stream is then pumped by pump 30 into the first section of the pipeline 31 shown as being buried with the ground 32. Shown generally at 35 is a pumping station, located above ground, having a pump 36 and a heat exchange unit 37 through which the oil may optionally be pumped in case refrigeration is required to bring the same to the desired temperature of 20° F. before entering the next section of buried pipeline, as indicated at 40.

On arriving at the terminal, the oil leaves the pipeline for passage through a steam heated heat exchanger 45 which serves to bring the oil to an appropriate demulsification temperature, here shown as being 100° F. The heated oil is then passed to a phase separating column 50 from which the gas-containing oil phase is taken overhead through line 51 for passage through pressure-reducing valve 52 and discharged into a flash column 55 from which natural gases are taken overhead through line 56, while the crude oil is taken as a bottoms stream through line 57. Returning to the phase separator column, it will be noted that the brine component of the emulsion is recovered through line 60.

In FIG. 2 of the drawings, there is shown an alternative schematic flow diagram of a pipelining system wherein a hot crude oil containing dissolved gases is pumped through line 70 into a gas separator of the three-stage type, as generally indicated at 71. The gas stream from the last stage of this separator passes via line 72 through a sea water-cooled heat exchanger 73 and thence to a second, refrigerated heat exchanger 75 where the temperature of the gas is reduced to approximately 20° F. This refrigerated gas stream is then introduced into a demethanizer column 76 (which can be of the conventional solvent or low temperature type) from which a light, essentially methane stream is taken overhead through line 77, while a heavier gas stream, containing some methane along with $C_2$–$C_4$ hydrocarbons, is discharged through line 80 into a gas absorption column 81 where the gas is absorbed by the incoming oil-in-brine emulsion.

Returning to separator 71, the gas-free crude oil is passed via line 85 to a sea water-cooled heat exchanger 86 which reduces the temperature of the oil to a relatively low level such as the 40° F. indicated in the figure. The cooled oil then enters the emulsifying unit 86 where it is admixed with incoming refrigerated brine. This brine component of the emulsion is pumped through line 87 to unit 86, along with a solution of a non-ionic surfactant as supplied through line 88. This brine stream if not already at temperatures below 25° F., can be refrigerated by passage through a heat exchanger 90 before being pumped into the emulsifying unit 86. From said unit, the resulting oil-in-brine emulsion is cooled to a relatively low temperature such as 25° F. by passage through a refrigerated heat exchange unit 95 before being directed into the gas absorption column 81 where it acts to absorb the $C_1$–$C_4$ gases introduced through line 80. The resulting gas-containing crude oil discharged from column 81 through line 96 then passes through a heat exchange unit 97 which brings the temperature of the stream down to level (here shown as 20° F.) at which the emulsion is to be pumped through the pipeline. Following this point, the treatment of the emulsion is essentially the same as that shown in FIG. 1, line 96 corresponding to line 20 of the latter figure.

Very heavy organic material known as tar is found dispersed in fine sand in the Arctic and sub-Arctic in such natural deposits as the Athabasca Tar Sands. Even when separated from the sand, this tar is too viscous to pump through pipelines at temperatures well above 100° F. This tar may be dispersed in brine as very small particles resembling crude oil-in-brine emulsions in which the oil droplets have solidified. These may be transported in cold pipelines similar to those in which the cold emulsions are transported. Here both economical pipeline transportation of a normally solid material is accomplished while causing no thermal damage to the environment.

We claim:

1. A method of transporting a viscous oil through a pipeline at temperatures below 32° F., said method comprising forming said oil into an oil-in-brine emulsion containing from about 40 to 70 percent by volume of oil with a brine having a freezing temperature at least as low as that to be employed in the pipeline; cooling said emulsion to the desired pipeline temperature below 32° F.; pumping the resulting cold emulsion through the pipeline; discharging the cold emulsion from the pipeline; and recovering the oil in liquid form free of brine by heating and demulsifying the discharged emulsion.

2. The method of claim 1 wherein the pipeline is insulated and buried within frozen earth and wherein the emulsion passed through the pipeline is cooled to a temperature between about 15° and 30° F. and is maintained within said range, whereby passage of the emulsion through the pipeline does not melt frozen earth adjacent the pipeline.

3. The method of claim 2 wherein the oil is a Prudhoe Bay crude oil and wherein the emulsion is formed by bringing said oil to a temperature of from about 40° F. to 100° F. and mixing the same, in an emulsion-generating apparatus, with a brine or aqueous salt solution which is at the same or a lower temperature.

4. The method of claim 3 wherein from about 0.1 to 5 percent by weight of a non-ionic surfactant is present in the mixture of oil and brine in the emulsion generating apparatus.

5. The method of claim 3 wherein natural gas existant in or recovered along with the crude oil is essentially present in solution in the disperse oil phase of the emulsion so that it may be transported efficiently in the same pipeline as the oil.

6. The method of claim 1 wherein the viscous oil is a very heavy crude oil or tar and wherein said oil or tar is dispersed or suspended in the brine in the form of small particles.

* * * * *